United States Patent [19]

Kato et al.

[11] 4,291,332
[45] Sep. 22, 1981

[54] PHASE-LOCKED CIRCUIT

[75] Inventors: Masaaki Kato, Kawasaki; Keisuke Ogi, Tokyo, both of Japan

[73] Assignee: Tokyo Shibaura Denki Kabushiki Kaisha, Kawasaki, Japan

[21] Appl. No.: 138,896

[22] Filed: Apr. 10, 1980

[51] Int. Cl.³ .......................... H04N 9/46; H04L 7/08
[52] U.S. Cl. .................................... 358/19; 358/150; 375/120
[58] Field of Search ................. 358/19, 148, 150, 153; 375/106, 118, 119, 120; 331/1 A; 328/135, 136, 139

[56] References Cited

U.S. PATENT DOCUMENTS

| 3,821,788 | 6/1974 | Kobayashi | 358/19 |
| 4,122,488 | 10/1978 | Mikado | 358/19 |
| 4,145,705 | 3/1979 | Yoshinaka | 358/19 |
| 4,214,262 | 7/1980 | Mizukami | 358/19 |

FOREIGN PATENT DOCUMENTS 51-129126 11/1976 Japan.

Primary Examiner—Benedict V. Safourek
Assistant Examiner—Michael A. Masinick
Attorney, Agent, or Firm—Oblon, Fisher, Spivak, McClelland & Maier

[57] ABSTRACT

Disclosed is a phase-locked circuit which includes a voltage controlled oscillator to supply a sampling clock signal to an analog-digital converter for converting a composite color television signal into a digital signal, and a control signal generator circuit to apply a control signal to the voltage controlled oscillator in response to the composite color television signal. The control signal generator circuit includes a burst separator for extracting a digital signal component corresponding to a color burst signal from a digital output signal from the analog-digital converter, a phase signal generator producing a reference phase signal, and a digital phase error detector circuit receiving the output signals from the burst separator and phase signal generator and supplying the voltage controlled oscillator with an output signal corresponding to the phase difference between both these input signals.

30 Claims, 35 Drawing Figures

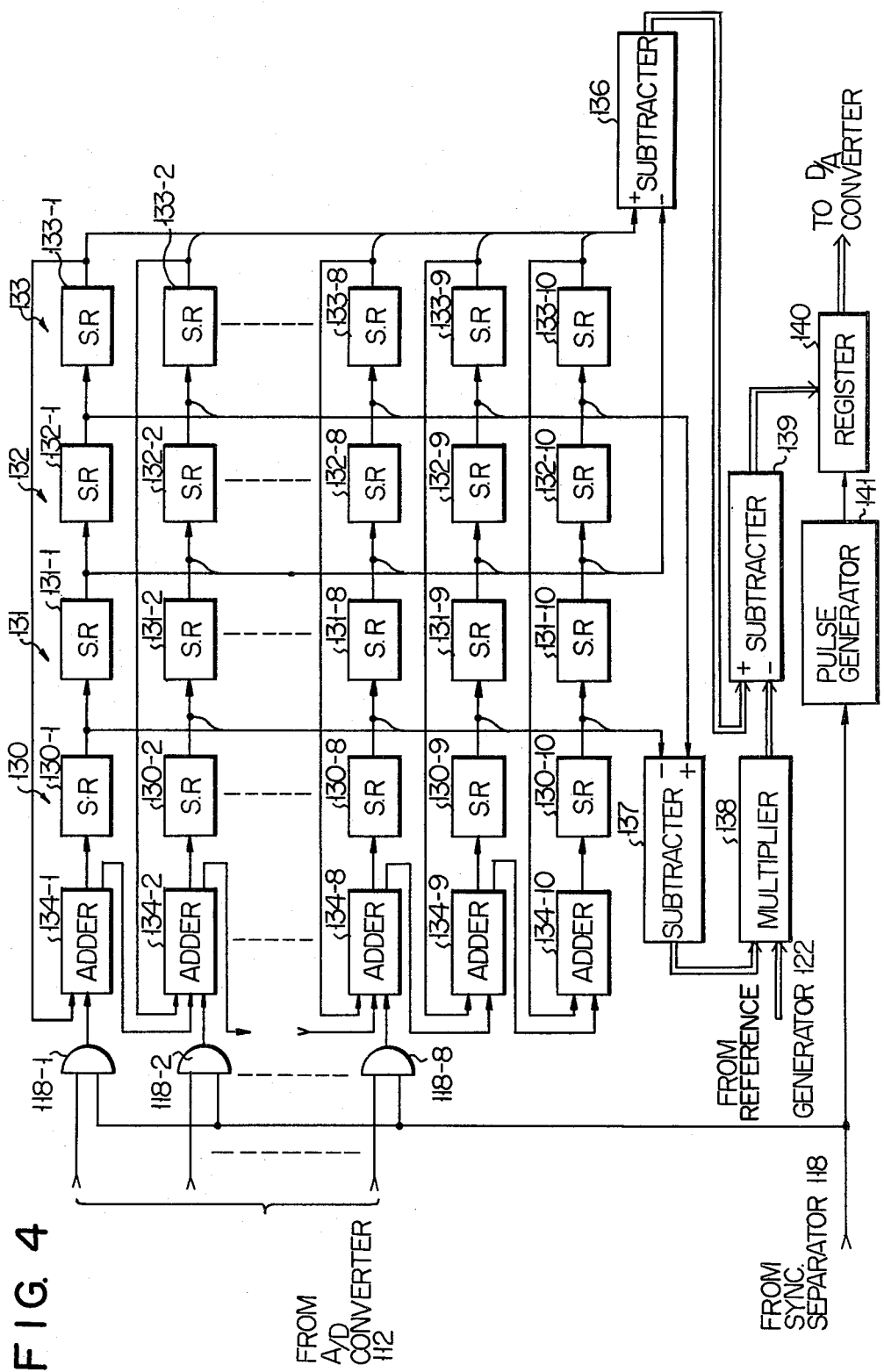

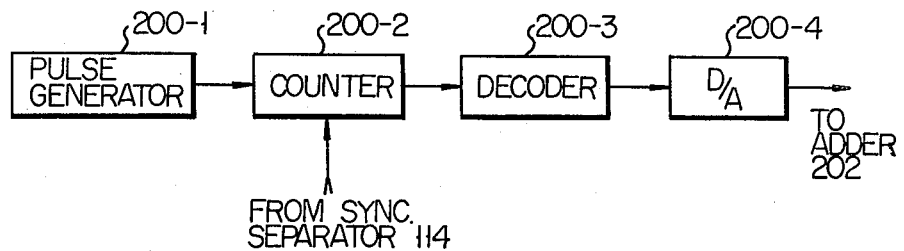
FIG. 6
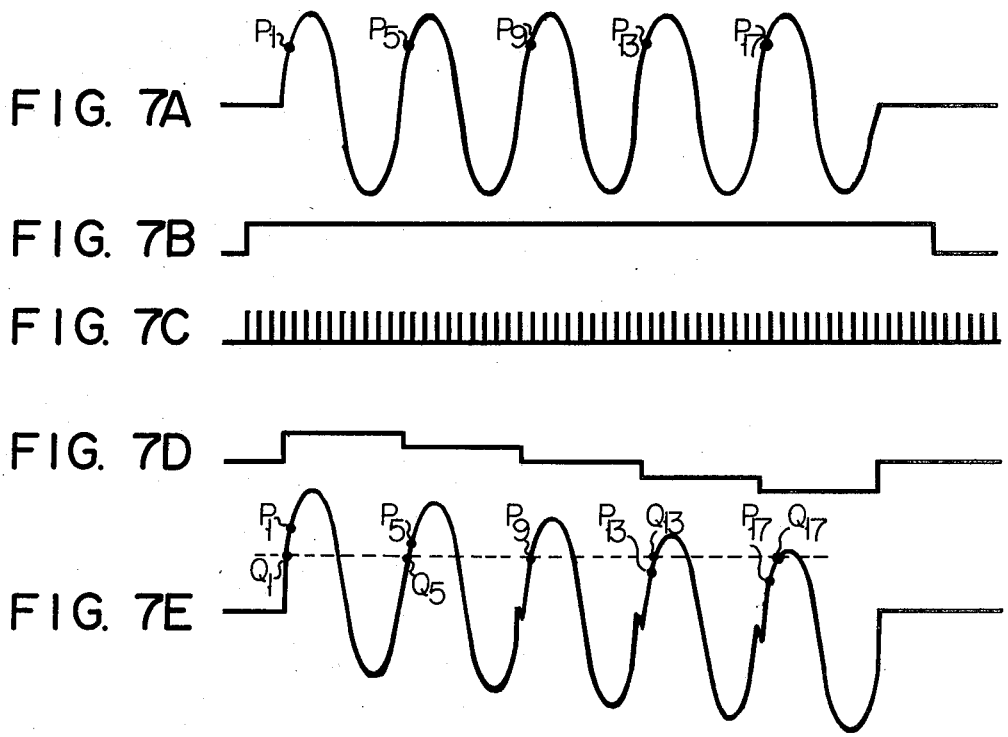

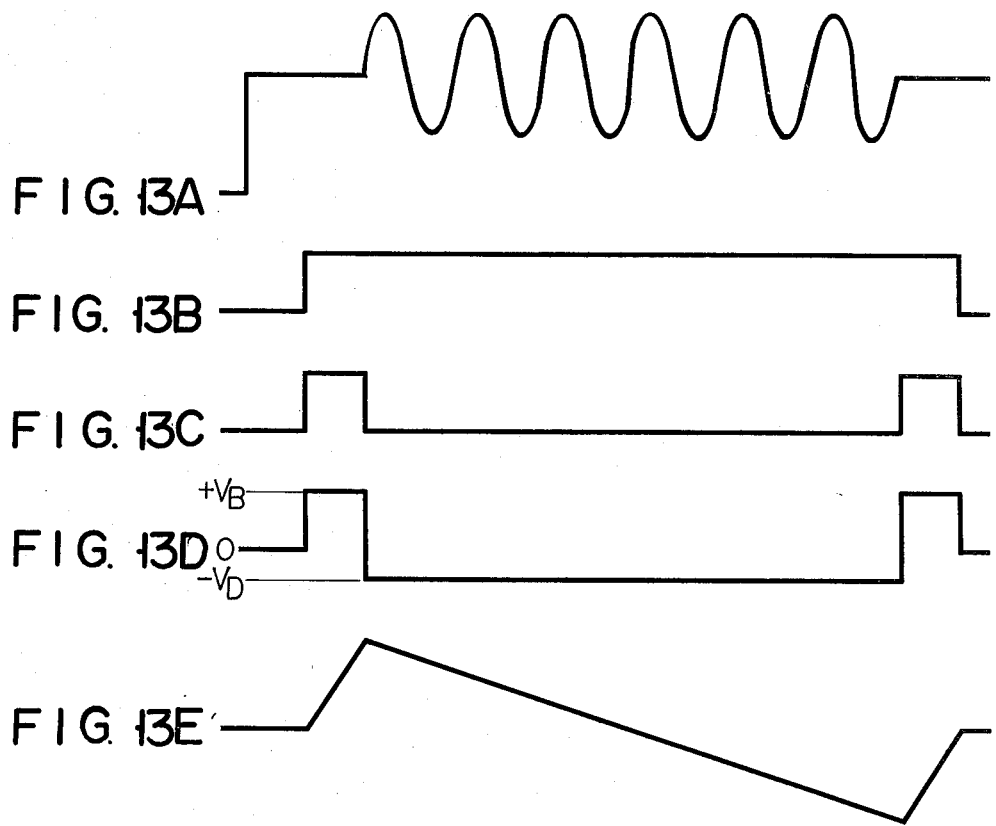
FIG. 13A
FIG. 13B
FIG. 13C
FIG. 13D
FIG. 13E
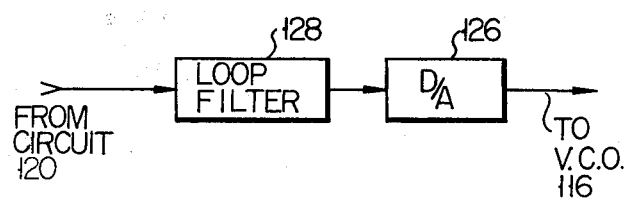
FIG. 14

F I G. 15
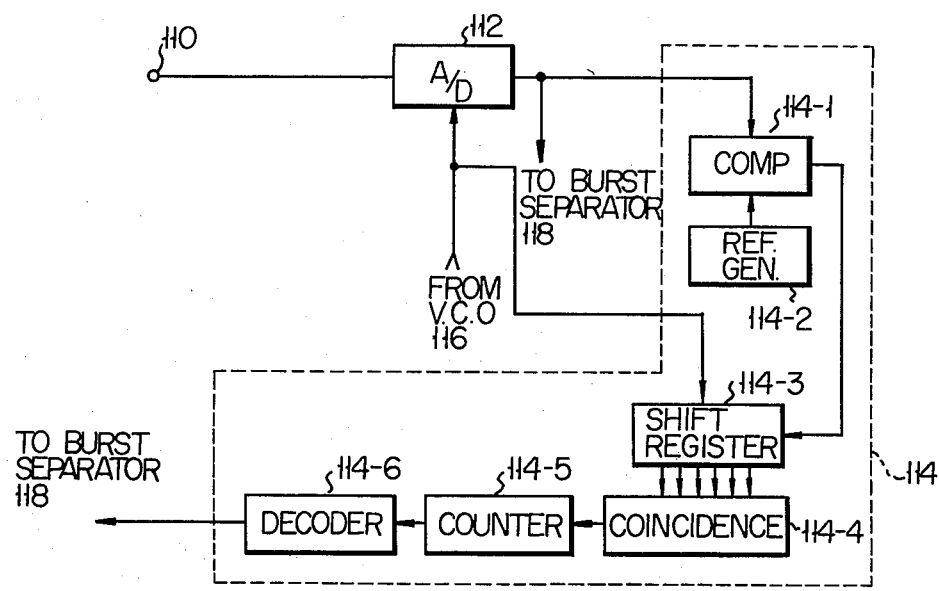
F I G. 16
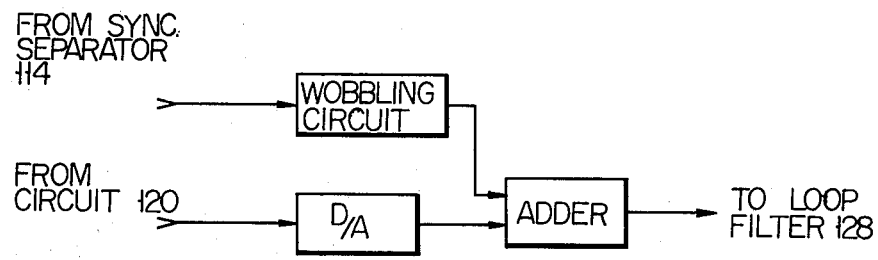

PHASE-LOCKED CIRCUIT

BACKGROUND OF THE INVENTION

This invention relates to a phase-locked circuit for phase-locking a clock signal used in converting an analog input signal such as a composite color television signal into a digital signal to a reference phase signal component included in the analog input signal.

Recently, high-speed analog-digital (A/D) converters and digital-analog (D/A) converters have become easily available, and there have been proposed various systems for digitally processing composite color television signals such as NTSC signals. For example, there is provided a digital decoder for separating an NTSC signal into a luminance signal and two chrominance signals or into three primary color signals.

In the digital decoder of this type, the sampling rate of a clock signal to be supplied as a sampling signal to an A/D converter for converting NTSC signals into digital signals should be set to correspond to an integral multiple (for example, triple or quadruple) or a rational multiple of the frequency of a color sub-carrier. Conventionally, there has been used such a phase-locked circuit as shown in FIG. 1 to obtain a sampling clock signal having the same frequency as and synchronized with the color sub-carrier.

The prior art phase-locked circuit shown in FIG. 1 is intended to control the phase of a sampling clock signal for driving an A/D converter 10 which converts an NTSC signal supplied to an input terminal 12 into a digital signal and supplies the digital output signal to an external circuit (not shown) through an output terminal 14, and is provided with a synchronizing signal separator circuit 16 and a burst separator circuit 18 which are connected to receive the input NTSC signal. After receiving the NTSC signal, the synchronizing signal separator circuit 16 supplies the burst separator circuit 18 with a synchronizing signal component extracted thereby from the NTSC signal. In response to the synchronizing signal component from the synchronizing signal separator circuit 16, the burst separator circuit 18 extracts a color burst signal from the color sub-carrier or NTSC signal, and supplies the color burst signal to a phase comparator 20. The phase comparator 20 compares the color burst signal from the burst separator circuit 18 with an output signal, having frequency equal to that of the color sub-carrier, from a frequency divider 22 for dividing the frequency of an output signal from a voltage controlled oscillator 24 having the center frequency at the integral multiple of that of the color sub-carrier, and produces an output voltage corresponding to the phase difference between both these input signals. The output voltage from the phase comparator 20 is supplied to a control terminal of the voltage controlled oscillator 24 through a loop filter 26. Thus, an output signal from the voltage controlled oscillator 24 is phase-locked to the color sub-carrier. The output signal of the voltage controlled oscillator 24 is also supplied to a phase shifter 28, where it is phase-shifted so as to have a phase required for color separation or the like, and then supplied as a sampling clock signal to the A/D converter 12. Thus, in response to the sampling clock signal phase-locked to the color sub-carrier, the A/D converter 10 converts the input NTSC signal into a digital signal.

In the circuit shown in FIG. 1, the phase comparator 20, frequency divider 22, voltage controlled oscillator 24, and loop filter 26 constitute a phase-locked loop in which the output signals of the voltage controlled oscillator 24 and the burst separator circuit 18 may be phase-locked to each other. Therefore, the difference between the phase of the clock signal at a point of time when it is actually sampled inside the A/D converter 10 and the phase of the color burst signal of the color sub-carrier in the NTSC signal includes the sum of the respective phase shifts of the burst separator circuit 18 and phase shifter 28 as well as an aperture delay of the A/D converter 10. That is, the stability of the phase difference between the color burst signal as the reference phase signal and the sampling clock pulse signal depends on the operating stability of the burst separator circuit 18 and phase shifter 28 and the aperture delay of the A/D converter 10, so that it is necessary to use a burst separator circuit and a phase shifter capable of stable operation with high accuracy, as well as an A/D converter with small-variation in aperture delay, in order to obtain a stable clock signal phase-locked to the color sub-carrier.

SUMMARY OF THE INVENTION

The object of this invention is to provide a phase-locked circuit producing an output signal with a highly stable phase synchronized with a reference phase synchronizing signal component included in an analog input signal such as a composite color television signal.

According to an embodiment of this invention, there is provided a phase-locked circuit which comprises voltage controlled oscillation means, analog-digital converter means converting an analog input signal containing a reference phase signal component into a digital signal in response to a clock signal from the voltage controlled oscillation means, reference phase signal separator means for extracting a digital reference phase signal corresponding to the reference phase signal component from a digital output signal from the analog-digital converter means, and operation means digitally calculating an error signal corresponding to the difference between a phase difference between the analog reference phase signal component and the clock signal and a predetermined reference phase difference in accordance with the digital reference phase signal from the reference phase signal separator means, and supplying the voltage controlled oscillation means with an analog output signal corresponding to the error signal as a control signal, so that the phase difference between the output signal from the voltage controlled oscillation means and the analog reference phase signal component becomes equal to the predetermined reference phase difference.

BRIEF DESCRIPTION OF THE DRAWINGS

FIG. 4 is a circuit diagram of a digital phase error detector circuit used with the phase-locked circuit of FIG. 2;

FIG. 6 is a block diagram of a wobbling circuit used with the phase-locked circuit of FIG. 5;

FIGS. 7A to 7E show signal waveforms for illustrating the operation of the phase-locked circuit of FIG. 5;

FIGS. 13A to 13E show signal waveforms for illustrating the operation of the phase-locked circuit of FIG. 11;

FIG. 14 is a block diagram of part of a modification of the phase-locked circuit according to any one of the above embodiments;

FIG. 15 is a block diagram of part of a modification of the phase-locked circuit of, for example, FIG. 5; and FIG. 16 is a block diagram of part of a modification of the phase-locked circuit of FIG. 11.

DETAILED DESCRIPTION OF THE PREFERRED EMBODIMENTS

Figure 1:
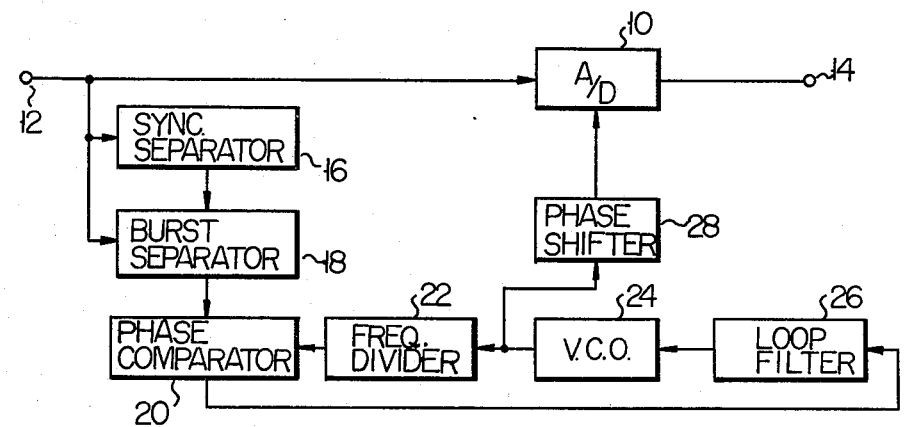
FIG. 1 is a block diagram of a prior art phase-locked circuit.
Figure 2:
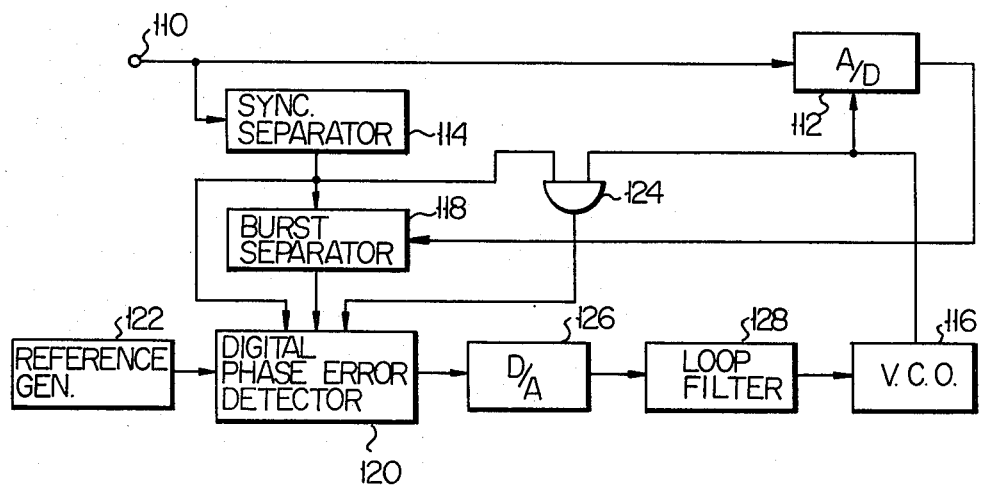
FIG. 2 is a circuit diagram of a phase-locked circuit according to an embodiment of this invention.
Figure 3A:
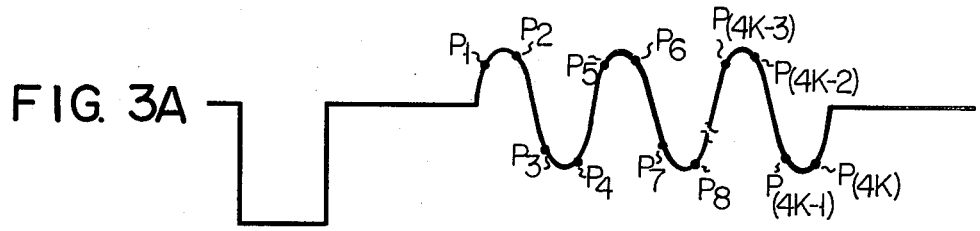
FIGS. 3A to 3C show signal waveforms for illustrating the operation of the phase-locked circuit of FIG. 2.
Figure 3B:
Figure 3C:

FIG. 2 shows a phase-locked circuit according to an embodiment of this invention. In this phase-locked circuit, a composite color television signal containing a synchronizing signal component and a color burst signal component as shown in FIG. 3A, e.g. an NTSC signal, is supplied to an A/D converter 112 and a synchronizing signal separator 114 through an input terminal 110. The A/D converter 112 converts an input analog signal into, for example, an 8-bit digital signal in response to a sampling clock pulse from a voltage controlled oscillator 116 as shown in FIG. 3B, and supplies the digital output signal to a burst separator 118. As for the synchronizing signal separator 114, it detects the synchronizing signal component in the analog input signal, and supplies the burst separator 118 with a burst gate pulse as shown in FIG. 3C. The burst separator 118 extracts the digital signal from the A/D converter 112 during a period limited by the burst gate pulse from the synchronizing signal separator 114. That is, the burst separator 118 successively produces 8-bit digital signals corresponding to the signal values of the color burst signal at sampling points $P_1$ to $P_{4k}$ shown in FIG. 3A, and supplies them to a digital phase error detector circuit 120. The digital phase error detector circuit 120, receiving from a reference generator 122 a digital data $\tan \theta_o$ corresponding to a digital reference phase difference $\theta_o$ ($0 \leq \theta_o < 90°$) representing a desired phase difference between the color burst signal and the sampling clock signal applied to the A/D converter 116, produces a digital output signal corresponding to the difference between a actual phase difference $\theta$ between the color burst signal and the sampling clock signal and the reference phase difference $\theta_o$ in accordance with the digital data $\tan \theta_o$ and the digital signal from the burst separator 118.

To perform the aforesaid function, the digital phase error detector circuit 120 is constructed as shown in detail in FIG. 4, for example. The digital phase error detector circuit 120 is provided with four cascade-connected shift register circuits 130 to 133 which are composed of groups of ten one-bit shift registers 130-1 to 130-10, 131-1 to 131-10, 132-1 to 132-10 and 133-1 to 133-10, respectively. The digital phase error detector circuit 120 further includes adders 134-1 to 134-10 whose output terminals are coupled respectively to the shift registers 130-1 to 130-10 and whose one input terminals are coupled respectively to the output terminals of the shift registers 133-1 to 133-10. The adders 134-1 to 134-8 receive the output signal from the burst separator 118 which is formed of AND gates 118-1 to 118-8 to receive the burst gate pulse from the synchronizing signal separator 114 and respective bit data in the 8-bit digital signal from the A/D converter 112. Moreover, the adders 134-2 to 134-10 are supplied with carry signals from the adders 134-1 to 134-9, respectively.

Output data from the shift register circuits 131 and 133 are supplied to a subtracter 136, while output data from the shift register circuits 130 and 132 are supplied to a subtracter 137. An output data from the subtracter 137 is supplied to one input terminal of a multiplier 138 which receives an output data $\tan \theta$ from the reference generator 122 at the other input terminal thereof. An output data of the multiplier 138, along with an output data from the subtracter 136, is supplied to a subtracter 139. An output data of the subtracter 139 is supplied to a register 140, which stores the output data from the subtracter 139 in response to an output pulse from a pulse generator 141 which produces a pulse at the trailing edge of the burst gate pulse from the burst separator 118.

The shift register circuits 130 to 133 are driven by output pulses from an AND gate 124 (not shown in FIG. 4 for simplicity) which receives the output signals from the voltage controlled oscillator 116 and synchronizing signal separator 114, as shown in FIG. 2, and is reset by output pulses from the pulse generator 141 after the output data from the subtracter 139 is stored in the register 140.

In the digital phase error detector circuit 120 of the above-mentioned construction, the 8-bit digital signal from the A/D converter 112 is added to output data of the shift register circuit 133, supplied to the shift register circuit 130, and then shifted to the shift register circuits 131 to 133 in succession. At the end of the burst gate pulse, the shift register circuits 133, 132, 131 and 130 store the sum totals $SD_{(4k-3)}$, $SD_{(4k-2)}$, $SD_{(4k-1)}$ and $SD_{(4k)}$ of sampling digital data at sampling points $P_1$, $P_5$, ..., $P_{(4k-3)}$; $P_2$, $P_6$, ..., $P_{(4k-2)}$; $P_3$, $P_7$, ..., $P_{(4k-1)}$; and $P_4$, $P_8$, ..., $P_{(4k)}$ of the color burst signal, respectively. Moreover, at the end of the burst gate pulse, the register 140 stores a data on the error E given by $$E = \sum_{j=1}^{K} \{(P_{(4j-3)} - P_{(4j-1)}) - (P_{(4j-2)} - P_{(4j)}) \tan\theta_o\} \quad (1)$$

That is, if the reference level and amplitude of the color burst signal are $L_1$ and $L_2$, respectively, the sampling data $SD_1$ to $SD_4$ at the points $P_1$ to $P_4$ shown in FIG. 3A, for example, may be expressed as follows:

$$SD_1 = L_1 + L_2 \sin \theta \quad (2)$$

$$SD_2 = L_1 + L_2 \cos \theta \quad (3)$$

$$SD_3 = L_1 - L_2 \sin \theta \quad (4)$$

$$SD_4 = L_1 - L_2 \cos \theta \quad (5)$$

Assuming $k=1$ for equation (1), the following equation is obtained:

$$E_1 = (SD_1 - SD_3) - (SD_2 - SD_4)\tan\theta_o \quad (6)$$
$$= 2L_2\sin\theta - 2L_2\cos\theta \cdot \tan\theta_o$$
$$= \frac{2L_2}{\cos\theta_o} \cdot \sin(\theta - \theta_o)$$

If $\theta = \theta_o$ is given, therefore, the error E of equation (1) is reduced to 0, while if $\theta \neq \theta_o$, then E corresponds to the difference between $\theta$ and $\theta_o$.

The error E corresponding the difference between $\theta$ and $\theta_o$ thus calculated in the digital phase error detector circuit 120 is supplied to a D/A converter 126 in the next stage. The D/A converter 126 applies, as a control signal, an analog signal corresponding to the digital output signal from the digital phase error detector circuit 120 to the voltage controlled oscillator 116 via the loop filter 128. Then, the voltage controlled oscillator 116 supplies the A/D converter 112 with the sampling clock signal with frequency corresponding to the analog signal from the D/A converter 126. Thus, the A/D converter 112 converts the analog input signal into a digital signal at a sampling rate corresponding to the frequency of the sampling clock signal from the voltage controlled oscillator 116.

In the circuit shown in FIG. 2, the A/D converter 112, burst separator 118, digital phase error detector circuit 120, and D/A converter 126 constitute a phase control circuit for controlling the phase of the output signal of the voltage controlled oscillator 116. This phase control circuit operates to satisfy the following equation, that is, to make $\theta = \theta_o$ hold.

$$\frac{1}{K} \sum_{j=1}^{K} \left( \frac{P_{(4j-3)} - P_{(4j-1)}}{P_{(4j-2)} - P_{(4j)}} \right) = \tan\theta_o \quad (7)$$

Thus, in the circuit shown in FIG. 2, the error signal E corresponding to the difference between the phase difference $\theta$ between the sampling clock signal and color burst signal and the reference phase difference $\theta_o$ is detected on the basis of the digital signal corresponding to the color burst signal out of the digital signals obtained at the A/D converter 112. As a result, it is made possible to securely set at the reference phase difference $\theta_o$ the phase difference between the color burst signal sample in the A/D converter 112 and the sampling clock signal having frequency equivalent to an integral multiple (quadruple in the embodiment of FIGS. 2 and 4) of the frequency of the color burst signal or color sub-carrier.

That is, since the phases of the sampling clock signal from the voltage controlled oscillator 116 and the color burst signal are compared digitally, the burst separator 118, digital phase error detector circuit 120, A/D converter 112 with aperture delay, and D/A converter 126 will never exert a bad influence upon the phase relation between the sampling clock signal and the color burst signal, thus causing no phase error in the sampling clock signal.

Meanwhile, in the phase-locked circuit shown in FIG. 2, the analog variation that can be detected by the A/D converter 112 is limited, and if the analog input is changed by a level below a predetermined level, the output signal of the A/D converter 112 will make no change, reducing the sensibility of the phase-locked circuit. In order to increase the sensibility of the phase-locked circuit, a wobbling circuit may suitable be used, as shown in FIG. 5, for example.

Figure 5:
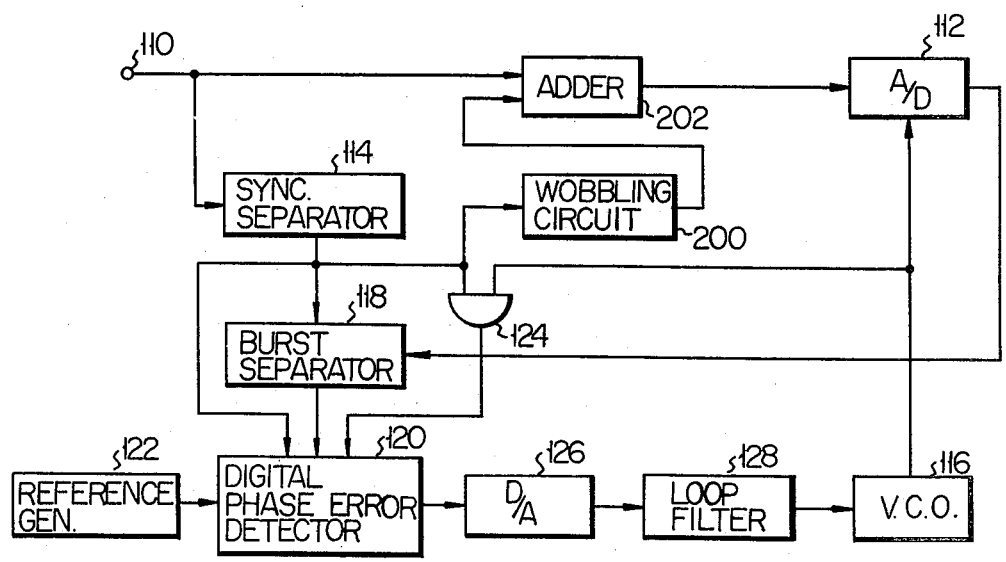
FIG. 5 is a circuit diagram of a phase-locked circuit according to another embodiment of the invention.

A phase-locked circuit shown in FIG. 5 has the same construction as the circuit shown in FIG. 2, except that it is further provided with a wobbling circuit 200 producing a staircase wave signal in response to the output signal from the synchronizing signal separator 114, and an adder 202 receiving the NTSC signal or analog input signal and the output signal from the wobbling circuit 200 and supplying an output signal to the A/D converter 112. The same circuit elements or parts as shown in FIG. 2 are designated by the same reference numerals, and the explanation thereof is omitted from the following description.

As shown in FIG. 7C, the wobbling circuit 200 includes a pulse generator 200-1 and a counter 200-2 for counting output pulses shown in FIG. 7C from the pulse generator 200-1 in response to the leading edge of the burst gate pulse shown in FIG. 7B. The counter 200-2 is reset by the trailing edge of the burst gate pulse. The count value in the counter 200-2 is decoded by a decoder 200-3 which produced an output signal varying by 1/5 of the minimum analog quantity the A/D converter 112 can detect, that is, of a unit quantized level $\Delta L$, for each period corresponding to one period of the color burst signal shown in FIG. 7A. A D/A converter 200-4 receiving the output signal of the decoder 200-3 supplies an adder 202 with such a staircase wave output signal as shown in FIG. 7D. Receiving the staircase wave output signal and color burst signal, the adder 202 produces an output signal shown in FIG. 7E. As is clear from FIG. 7E, color burst signal components in cycles including the sampling points $P_1$, $P_5$, $P_{13}$ and $P_{17}$ are biased respectively by levels $+2/5\ \Delta L$, $+1/5\ \Delta L$, $-1/5\ \Delta L$ and $-2/5\ \Delta L$ as compared with a color burst signal component in a cycle including the sampling point $P_9$, with respect to the amplitude. Namely, the color burst signal components in the cycles including the sampling points $P_1$, $P_5$, $P_{13}$ and $P_{17}$ have the same amplitude as the amplitude for the sampling point $P_9$ at sampling points $Q_1$, $Q_5$, $Q_{13}$ and $Q_{17}$. Equivalently, therefore, these burst signal components have phase differences $-2/5\ \Delta\theta_o$, $-1/5\ \Delta\theta_o$, $+1/5\ \Delta\theta_o$ and $+2/5\ \Delta\theta_o$ as compared with the color burst signal component including the sampling point $P_9$, respectively. In this case, the error E is varied by the unit quantized level each time the phase difference $(\theta - \theta_0)$ change by $\Delta\theta_o$.

Sampling data $SDQ_1$, $SDQ_5$, $SDQ_{13}$ and $SDQ_{17}$ at these points $Q_1$, $Q_5$, $Q_{13}$ and $Q_{17}$ may be given from equation (2) as follows:

$$SDQ_1 = L_1 + L_2\sin(\theta - 2/5\Delta\theta_o) \quad (8)$$

$$SDQ_5 = L_1 + L_2\sin(\theta - 1/5\Delta\theta_o) \quad (9)$$

$$SDQ_{13} = L_1 + L_2\sin(\theta + 1/5\Delta\theta_o) \quad (10)$$

$$SDQ_{17} = L_1 + L_2\sin(\theta + 2/5\Delta\theta_o) \quad (11)$$

Phase errors $EP_1$, $EP_5$, $EP_9$, $EP_{13}$ and $EP_{17}$ of the color burst components respectively including the sampling points $P_1$, $P_5$, $P_9$, $P_{13}$ and $P_{17}$ may, utilizing equation (6), be expressed as follows:

$$EP_1 = \frac{2L_2}{\cos\theta_o} \sin\left(\theta - \theta_o - \frac{2}{5}\Delta\theta_o\right) \quad (12)$$

$$EP_5 = \frac{2L_2}{\cos\theta_o} \sin\left(\theta - \theta_o - \frac{1}{5}\Delta\theta_o\right) \quad (13)$$

$$EP_9 = \frac{2L_2}{\cos\theta_o} \sin(\theta - \theta_o) \quad (14)$$

$$EP_{13} = \frac{2L_2}{\cos\theta_o} \sin\left(\theta - \theta_o + \frac{1}{5}\Delta\theta_o\right) \quad (15)$$

$$EP_{17} = \frac{2L_2}{\cos\theta_o} \sin\left(\theta - \theta_o + \frac{2}{5}\Delta\theta_o\right) \quad (16)$$

Figure 8A:
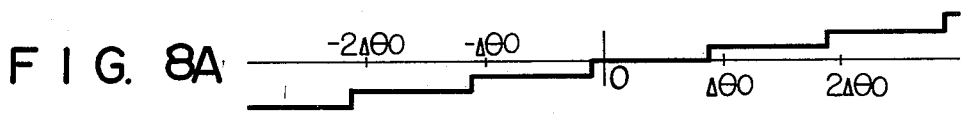
FIGS. 8A to 8F show signal waveforms for illustrating the function of the wobbling circuit of FIG. 6.
Figure 8B:
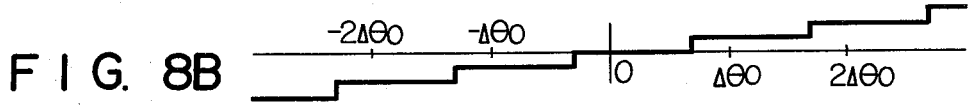
Figure 8C:
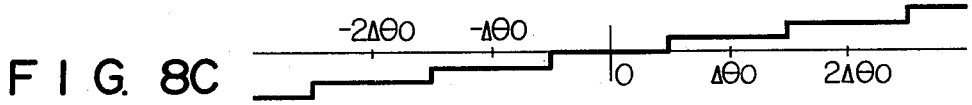
Figure 8D:
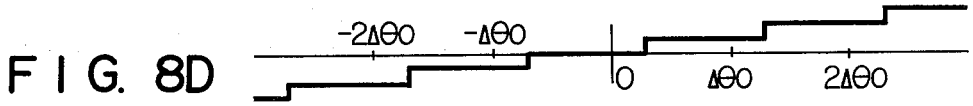
Figure 8E:
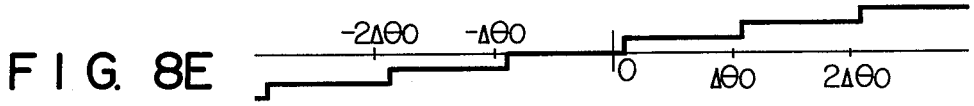
Figure 8F:
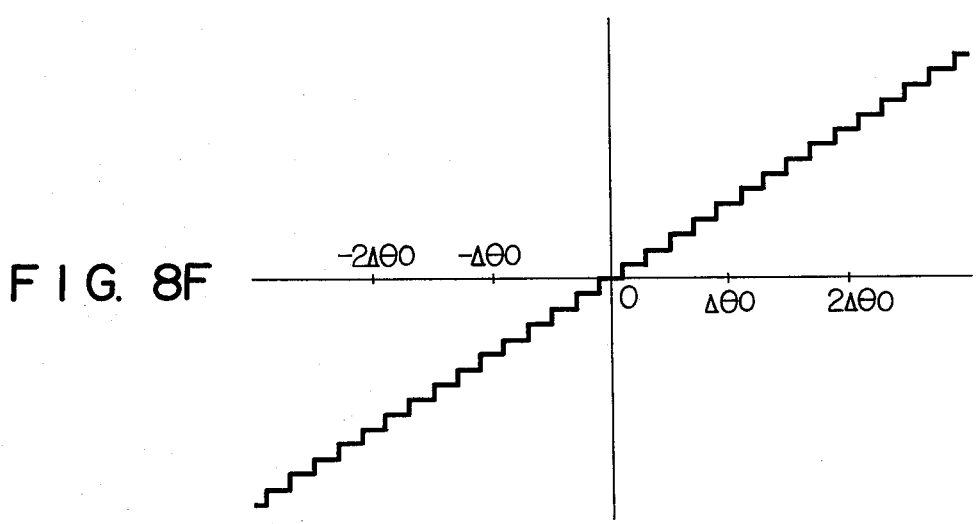

FIGS. 8A to 8E show quantized error signals corresponding to these error signals $EP_1$, $EP_5$, $EP_9$, $EP_{13}$ and $EP_{17}$. FIG. 8F shows the relationship between the phase difference $(\theta - \theta_o)$ and the total sum of the quantized error signals corresponding to the error signals $EP_1$, $EP_5$, $EP_9$, $EP_{13}$ and $EP_{17}$. As is evident from FIG. 8F, the unit quantized level varies with every change of the phase data $(\theta - \theta_o)$ by $\Delta\theta_o$.

Figure 9:
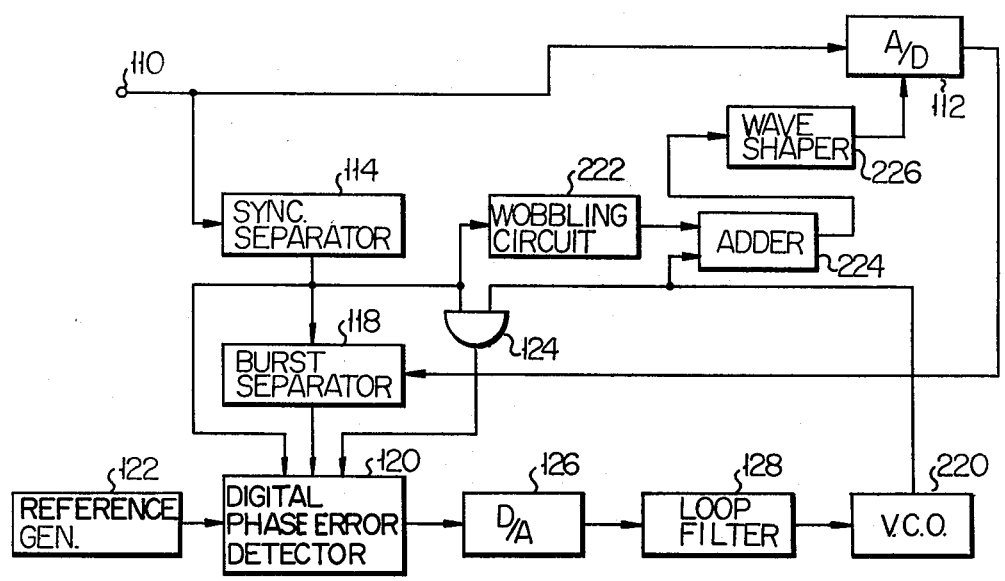
FIG. 9 is a circuit diagram of a phase-locked circuit according to still another embodiment of the invention.

FIG. 9 shows still another embodiment of this invention. The circuit shown in FIG. 9 has the same construction as the circuit of FIG. 2, except that it uses a voltage controlled oscillator 220 to produce a sine-wave signal as shown in FIG. 10C instead of using the voltage controlled oscillator 120, and that it is further provided with a wobbling circuit producing a staircase wave signal in response to an output signal from the synchronizing signal separator 114, an adder 224 for adding the output signals of the wobbling circuit 222 and voltage controlled oscillator 220, and a wave shaper 226 to supply sampling pulses to the A/D converter 112 in response to the output signal of the adder 224. The same circuit elements or parts as those shown in FIG. 2 are designated by the same reference numerals, and the explanation thereof is excluded from the following description.

Figure 10A:
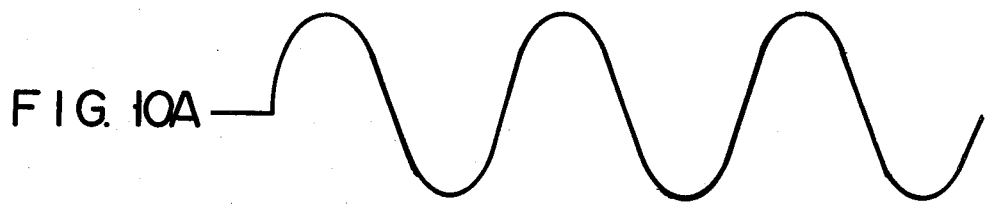
FIGS. 10A to 10E show signal waveforms for illustrating the operation of the phase-locked circuit of FIG. 9.
Figure 10B:
Figure 10C:
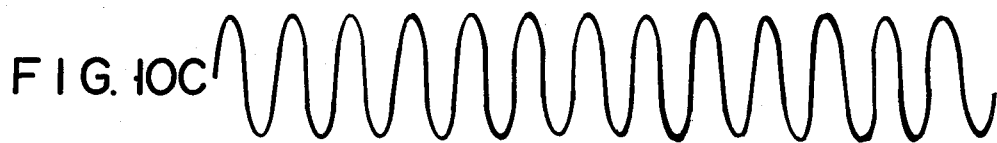
Figure 10D:
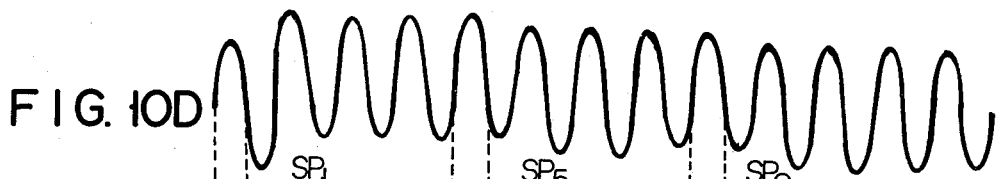
Figure 10E:

The wobbling circuit 222 which may, for example, be of the same construction as the wobbling circuit 200 shown in FIG. 5, produces the staircase wave signal (FIG. 10B) which is varied by a predetermined level for each period of the color burst signal shown in FIG. 10A. The staircase wave signal from the wobbling circuit 222 is added in the adder 224 to the sine-wave output signal (FIG. 10C) from the voltage controlled oscillator 220 having a period corresponding to ¼ of that of the color burst signal. Thus, the adder 224 produces a sine-wave signal whose average amplitude value changes with every period of the color burst signal, as shown in FIG. 10D. The output signal of the adder 224 is compared with, for example, zero level in the wave shaper 226. The wave shaper 226 supplies the A/D converter 112 with a pulse signal as shown in FIG. 10E according to the relationship between the input signal and threshold level. Among signal pulses shown in FIG. 10E, sampling pulses $SP_1$ and $SP_5$ have phase differences $2/5 \Delta\theta_o$ and $1/5 \Delta\theta_o$ with respect to a sampling pulse $SP_9$, respectively. Hereupon, the sampling pulses $SP_1$, $SP_5$ and $SP_9$ correspond to e.g. the sampling points $P_1$, $P_5$ and $P_9$ for the color burst signal shown in FIG. 7A, respectively, and sampling pulses to define the sampling points $P_{13}$ and $P_{17}$ (not shown) have phase differences $-1/5 \Delta\theta_o$ and $-2/5 \Delta\theta_o$ as compared with the sampling pulse $SP_9$, respectively. Accordingly, the phase errors $EP_1$, $EP_5$, $EP_9$, $EP_{13}$ and $EP_{17}$ in the color burst signal components respectively including the sampling points $P_1$, $P_5$, $P_9$, $P_{13}$ and $P_{17}$ can be expressed by equations (12) to (16), respectively, and the same effect of the circuit of FIG. 5 may be obtained with use of the circuit of this embodiment.

Figure 11:
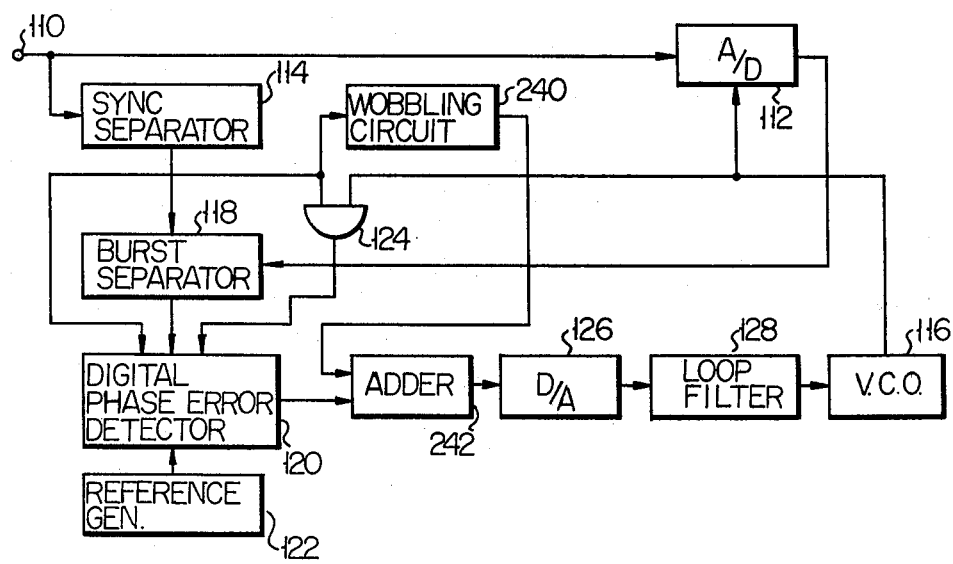
FIG. 11 is a circuit diagram of a phase-locked circuit according to a further embodiment of the invention.

FIG. 11 shows a phase-locked circuit according to a further embodiment of the invention. The circuit shown in FIG. 11 has the same construction as the circuit of FIG. 5, except that it is provided with a wobbling circuit 240 producing such an output signal as shown in FIG. 12B in response to the output signal from the synchronizing signal separator 114, and an adder 242 adding the output signals from the wobbling circuit 240 and the digital phase error detector circuit 120 and supplying an addition output signal to the D/A converter 126. The same circuit elements or parts as those shown in FIG. 5 are designated by the same reference numerals, and are excluded from the following description.

Figure 12:
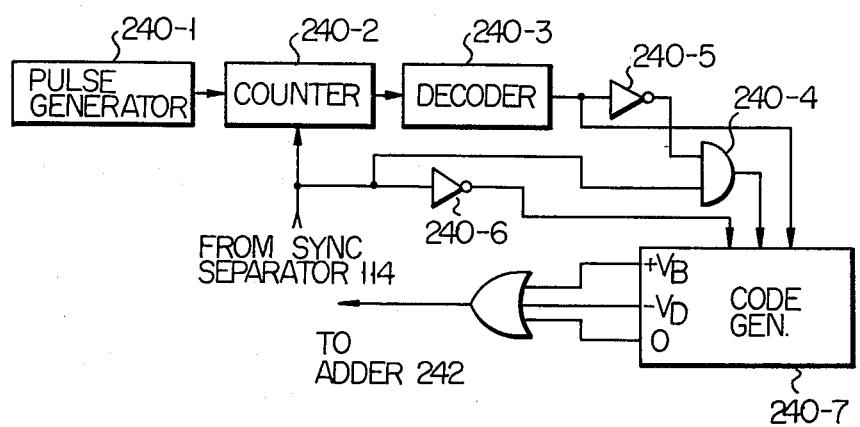
FIG. 12 is a detailed circuit diagram of a wobbling circuit used with the phase-locked circuit of FIG. 11.

As shown in FIG. 12, the wobbling circuit 240 includes a high-frequency pulse generator 240-1, a 240-2 which starts counting operation in response to the leading edge of the burst gate pulse shown in FIG. 13B from the synchronizing signal separator 114 and stops the operation in response to the trailing edge of the burst gate pulse, and a decoder 240-3 which produces "1"-level signals while the content of the counter 240-2 is indicating the period between the leading edge of the burst gate pulse and the start point of the color burst signal and the period between the end point of the color burst signal and the trailing edge of the burst gate pulse, as shown in FIG. 13C. Further, the circuit 240 is provided with an AND gate 240-4 receiving the output signal from the decoder 240-3 through an inverter 240-5 and also receiving the output signal from the synchronizing signal separator 14, an inverter 240-6 for inverting the output signal from the synchronizing signal separator 114, and a code generator 240-7 producing from $-V_D$, O and $+V_B$ output terminals thereof digital output signals corresponding respectively to output levels $-V_D$, O and $+V_B$ in response respectively to the output signals from the decoder 240-3, AND gate 240-4, and inverter 240-6. The digital output signals from the code generator 240-7 are supplied to the adder 242 through an OR gate 240-8. That is, the adder 242 adds e.g. an 8-bit digital signal corresponding to a signal as shown in FIG. 13D and the digital output signal from the phase error detector circuit 120, and supplies the result of the addition to the D/A converter 126. Receiving an analog signal from the D/A converter 126, the voltage controlled oscillator 116 produces an output signal whose phase deviation from the reference phase difference determined by the phase error detector circuit 120 varies as shown in FIG. 13E. Accordingly, with the circuit of this embodiment, the phases of the sampling pulses are deviated, and the same effect of the circuits of the aforementioned embodiments may be obtained.

Although illustrative embodiments of this invention have been described herein, it is to be understood that the invention is not limited to those precise embodiments. For example, in the above embodiments, the sampling clock signal is so controlled as to have frequency four times as high as that of the color sub-carrier and fixed phase relative to the color sub-carrier. Alternatively, however, clock signals with varied frequencies corresponding to rational multiples of the frequency of the color sub-carrier may be produced by changing the operation form to be executed in the digital phase error detector circuit 120.

Further, although the phase error detector circuit 120 is so constructed as to calculate with the same accuracy the error signal E corresponding to the difference between the reference phase difference $\theta_o$ and the phase difference $\theta$ between the sampling clock signal and analog inut signal, it may also be so constructed as to calculate the error signal E with accuracy varying according to the level of the error signal E and to control the voltage controlled oscillator 116 by means of the calculated data.

Further, although the digital phase error detector circuit 120 is so constructed as to calculate the error signal E by using all the sampling data, it may also be so constructed as to obtain the error signal E by using sampling data at e.g. four consecutive points as follow:

$$E = (P_{(4j-3)} - P_{(4j-1)}) - (P_{(4j-2)} - P_{(4j)}) \tan \theta_o \qquad (17)$$

Moreover, in connection with the above embodiments, there has been described the way of obtaining a clock signal phase-locked to the color burst signal which is required in A/D-converting the NTSC signal or a composite color television signal. As for the analog input signal, however, it is not limited to such composite color television signal, and it is possible to use an analog signal which contains a reference phase signal component and is A/D-converted in accordance with the sampling clock signal. In a certain communication system, for example, it will be possible to insert intermittently a pilot signal as the reference phase signal in a signal wave for transmission and to A/D-convert the input signal wave in accordance with a clock pulse phase-locked to the pilot signal at the receiving side. Also in such case, the same effect of the above embodiments may be obtained by handling the pilot signal in the same manner as the burst signal for the NTSC signal.

Furthermore, the loop filter 128 provided next to the D/A converter 126 in the above embodiments may be replaced by a digital loop filter coupled ahead of the D/A converter 126, as shown in FIG. 14.

Further, in the above embodiments, the synchronizing signal separator 114 is coupled so as directly to receive the NTSC signal. Alternatively, the separator 114 may be so designed as to receive the digital output signal from the A/D converter 112 and to produce a burst gate pulse on the basis of the digital output pulse signal, as shown in FIG. 15. In the synchronizing signal separator 114 of FIG. 15, there is provided a comparator 114-1 comparing a reference signal from a reference signal generator 114-2 with the output signal from the A/D converter 112 and producing a signal "0" or "1" according to the relationship between these two signals. The output signal from the comparator 114-1 is stored in a 6-stage shift register circuit 114-3 in response to the output pulse from the voltage controlled oscillator 116. When the content of the shift register circuit 114-3 takes a value representing the trailing edge of a horizontal synchronizing pulse, e.g. (1,1,1,0,0,0), a coincidence circuit 114-4 supplies a pulse to a counter 114-5 to cause the counter 114-5 to start counting operation. The count value in the counter 114-5 is decoded by a decoder 114-6, which produces e.g. a burst gate pulse as shown in FIG. 3C. The counter 114-5 is automatically reset when it has counted a predetermined number.

Moreover, in the embodiment as shown in FIG. 11, the digital ouptut signal of the wobbling circuit 240 is added to the digital output signal of the digital phase error detector circuit 120. Instead of using the wobbling circuit 240, as shown in FIG. 16, a wobbling circuit 250 producing an output signal shown in FIG. 13D may be used, so that the output signals of the wobbling circuit 250 and the D/A converter 126 are added by an adder 252, and that an addition output signal from the adder 252 is applied to the voltage controlled oscillator 116 via the loop filter 128.

Furthermore, although the 5-cycle color burst signal is taken as an example in the embodiments shown in FIGS. 5, 9 and 11, the cycle number of the color burst signal is not limited to 5, and the same effect may be obtained with use of a color burst signal with e.g. an even cycle number.

What we claim is:

1. A phase-locked circuit comprising:
voltage controlled oscillation means;
analog-digital converter means converting an analog input signal containing a reference phase signal component into a digital signal in response to a clock signal from said voltage controlled oscillation means;
reference phase signal separator means for extracting a digital reference phase signal corresponding to said reference phase signal component from a digital output signal supplied from said analog-digital converter means; and
operation means digitally calculating an error signal corresponding to the difference between a predetermined reference phase difference and a phase difference between said analog reference phase signal component and said clock signal on the basis of the digital reference phase signal from said reference phase signal separator means, and supplying said voltage controlled oscillation means with an analog output signal corresponding to said error signal as a control signal, thereby causing the phase difference between the output signal from said voltage controlled oscillation means and said analog reference phase signal component to be made equal to said predetermined reference phase difference.

2. A phase-locked circuit according to claim 1, wherein said voltage controlled oscillation means produces a clock signal with frequency equivalent to an integral multiple of the frequency of said reference phase signal component.

3. A phase-locked circuit according to claim 1 or 2, wherein said reference phase signal separator means includes a gate signal generator receiving said analog input signal and producing an output signal during a period corresponding to a period when said reference phase signal component is produced, and a gating circuit coupled to said analog-digital converter means and said gate signal generator and allowing the digital output signal from said analog-digital converter means to pass in response to the output signal from said gate signal generator.

4. A phase-locked circuit according to claim 3, wherein said operation means includes a phase difference signal generator producing a digital signal corresponding to said predetermined reference phase difference, a digital operation unit receiving the output signals from said reference phase signal separator means and said phase difference signal generator and producing a digital signal corresponding to the difference between the predetermined reference phase difference and the phase difference between said reference phase signal component and the clock signal from said voltage controlled oscillation means in accordance with said received signals, and a digital-analog converter for converting the digital signal from said digital operation unit into an analog signal.

5. A phase-locked circuit according to claim 4, wherein said operation means further includes a loop filter receiving an output signal from said digital-analog converter and supplying an output signal to said voltage controlled oscillation means.

6. A phase-locked circuit according to claim 4, wherein said operation means further includes a loop filter receiving the digital output signal from said digital operation unit and supplying an output signal to said digital-analog converter.

7. A phase-locked circuit according to claim 3, further comprising a staircase wave signal generator producing in response to the output signal from said gate signal generator a staircase wave signal whose level is changed for each cycle of the reference phase signal component in said analog input signal, and an adder circuit for adding the output signal from said staircase wave signal generator and said analog input signal.

8. A phase-locked circuit according to claim 7, wherein said operation means includes a phase difference signal generator producing a digital signal corresponding to said predetermined reference phase difference, a digital operation unit receiving the output signals from said reference phase signal separator means and said phase difference signal generator and producing a digital signal corresponding to the difference between the phase difference between said reference phase signal component and the clock signal from said voltage controlled oscillation means and said predetermined reference phase difference in accordance with said received signals, and a digital-analog converter for converting the digital signal from said digital operation unit into an analog signal.

9. A phase-locked circuit according to claim 8, wherein said operation means further includes a loop filter receiving an output signal from said digital-analog converter and supplying an output signal to said voltage controlled oscillation means.

10. A phase-locked circuit according to claim 8, wherein said operation means further includes a loop filter receiving the digital output signal from said digital operation unit and supplying an output signal to said digital-analog converter.

11. A phase-locked circuit according to claim 3, wherein said voltage controlled oscillation means produces a sine-wave signal, said phase-locked circuit further comprising a staircase wave signal generator producing in response to an output signal from said gate signal generator a staircase wave signal whose level is changed for each cycle of the reference phase signal component in said analog input signal, an adder circuit for adding the output signal from said staircase wave signal generator and the sine-wave output signal from said voltage controlled oscillation means, and a comparator comparing the level of an output signal from said adder circuit with a reference level and supplying said analog-digital converter means with a pulse signal as a clock signal whose level is selectively set high or low according to the relationship between the level of the output signal from said adder circuit and said reference level.

12. A phase-locked circuit according to claim 11, wherein said operation means includes a phase difference signal generator producing a digital signal corresponding to said predetermined reference phase difference, a digital operation unit receiving output signals from said reference phase signal separator means and said phase difference signal generator and producing a digital signal corresponding to the difference between the predetermined reference phase difference and the phase difference between said reference phase signal component and the clock signal from said voltage controlled oscillation means in accordance with said received signals, and a digital-analog converter for converting the digital signal from said digital operation unit into an analog signal.

13. A phase-locked circuit according to claim 12, wherein said operation means further includes a loop filter receiving an output signal from said digital-analog converter and supplying an output signal to said voltage controlled oscillation means.

14. A phase-locked circuit according to claim 12, wherein said operation means further includes a loop filter receiving the digital output signal from said digital operation unit and supplying an output signal to said digital-analog converter.

15. A phase-locked circuit according to claim 3, further comprising a digital signal generator producing in response to the output signal from said gate signal generator a digital signal representing a constant-level signal during a period when said reference phase signal component is produced, and in which said operation means includes a phase difference signal generator producing a digital signal corresponding to said predetermined reference phase difference, a digital operation unit receiving output signals from said reference phase signal separator means and said phase difference signal generator and producing a digital signal corresponding to the difference between the predetermined reference phase difference and the phase difference between said reference phase signal component and the clock signal from said voltage controlled oscillation means in accordance with said received signals, an adder circuit for adding the digital signal from said digital operation unit and the output signal from said digital signal generator, and a digital-analog converter for converting an output signal from said adder circuit into an analog signal.

16. A phase-locked circuit according to claim 15, wherein said operation means further includes a loop filter receiving an output signal from said digital-analog converter and supplying an output signal to said voltage controlled oscillation means.

17. A phase-locked circuit according to claim 15, wherein said operation means further includes a loop filter receiving the output signal from said adder circuit and supplying an output signal to said digital-analog converter.

18. A phase-locked circuit according to claim 3 further comprising a constant-level signal generator producing in response to the output signal from said gate signal generator a constant-level output signal during a period when said reference phase signal component is produced, and in which said operation means includes a phase difference signal generator producing a digital signal corresponding to said predetermined reference phase difference, a digital operation unit receiving the output signals from said reference phase signal separator means and said phase difference signal generator and producing a digital signal corresponding to the difference between the predetermined reference phase difference and the phase difference between said reference phase signal component and the clock signal from said voltage controlled oscillation means in accordance with said receiving signals, a digital-analog converter for converting the digital signal from said digital operation unit into an analog signal, and an adder circuit for adding an output signal from said digital-analog converter and the output signal from said constant-level signal generator.

19. A phase-locked circuit according to claim 18, wherein said operation means further includes a loop filter receiving the digital output signal from said digital operation unit and supplying an output signal to said digital-analog converter.

20. A phase-locked circuit according to claim 18, wherein said operation means further includes a loop filter receiving an output signal from said adder circuit and supplying an output signal as a clock signal to said voltage controlled oscillation means.

21. A phase-locked circuit according to claim 1 or 2, wherein said reference phase signal separator means includes a gate signal generator receiving the output signal from said analog-digital converter means and producing an output signal during a period corresponding to a period when said reference phase signal component is produced, and a gating circuit coupled to said analog-digital converter means and said gate signal generator and allowing the digital output signal from said analog-digital converter means to pass in response to the output signal from said gate signal generator.

22. A phase-locked circuit according to claim 21, wherein said operation means includes a phase difference signal generator producing a digital signal corresponding to said predetermined reference phase difference, a digital operation unit receiving the output signals from said reference phase signal separator means and said phase difference signal generator and producing a digital signal corresponding to the difference between the predetermined reference phase difference and the phase difference between said reference phase signal component and the clock signal from said voltage controlled oscillation means in accordance with said received signals, and a digital-analog converter for converting the digital signal from said digital operation unit into an analog signal.

23. A phase-locked circuit according to claim 22, wherein said operation means further includes a loop filter receiving an output signal from said digital-analog converter and supplying an output signal to said voltage controlled oscillation means.

24. A phase-locked circuit according to claim 22, wherein said operation means further includes a loop filter receiving the digital output signal from said digital operation unit and supplying an output signal to said digital-analog converter.

25. A phase-locked circuit according to claim 21, further comprising a staircase wave signal generator producing in response to the output signal from said gate signal generator a staircase wave signal whose level is changed for each cycle of the reference phase signal component in said analog input signal, and an adder circuit for adding the output signal from said staircase wave signal generator and said analog input signal.

26. A phase-locked circuit according to claim 25, wherein said operation means includes a phase difference signal generator producing a digital signal corresponding to said predetermined reference phase difference, a digital operation unit receiving the output signals from said reference phase signal separator means and said phase difference signal generator and producing a digital signal corresponding to the difference between the phase difference between said reference phase signal component and the clock signal from said voltage controlled oscillation means and said predetermined reference phase difference in accordance with said received signals, and a digital-analog converter for converting the digital signal from said digital operation unit into an analog signal.

27. A phase-locked circuit according to claim 26, wherein said operation means further includes a loop filter receiving an output signal from said digital-analog converter and supplying an output signal to said voltage controlled oscillation means.

28. A phase-locked circuit according to claim 27, wherein said operation means further includes a loop filter receiving the digital output signal from said digital operation unit and supplying an output signal to said digital-analog converter.

29. A phase-locked circuit according to claim 21, wherein said voltage controlled oscillation means produces a sine-wave signal, said phase-locked circuit further comprising a staircase wave signal generator producing in response to an output signal from said gate signal generator a staircase wave signal whose level is changed for each cycle of the reference phase signal component in said analog input signal, an adder circuit for adding the output signal from said staircase wave signal generator and the sine-wave output signal from said voltage controlled oscillation means, and a comparator comparing the level of an output signal from said adder circuit with a reference level and supplying said analog-digital converter means with a pulse signal as a clock signal whose level is selectively set high or low according to the relationship between the level of the output signal from said adder circuit and said reference level.

30. A phase-locked circuit according to claim 29, wherein said operation means includes a phase difference signal generator producing a digital signal corresponding to said predetermined reference phase difference, a digital operation unit receiving output signals from said reference phase signal separator means and said phase difference signal generator and producing a digital signal corresponding to the difference between the predetermined reference phase difference and the phase difference between said reference phase signal component and the clock signal from said voltage controlled oscillation means in accordance with said received signals, and a digital-analog converter for converting the digital signal from said digital operation unit into an analog signal.

* * * * *